(12) United States Patent
Shasteen

(10) Patent No.: US 11,065,925 B2
(45) Date of Patent: Jul. 20, 2021

(54) VALVE STEM APPARATUS, ASSEMBLIES AND METHODS FOR USE

(71) Applicant: LiquiTube Industries LLC, Marion, IL (US)

(72) Inventor: Dan Millard Shasteen, Marion, IL (US)

(*) Notice: Subject to any disclaimer, the term of this patent is extended or adjusted under 35 U.S.C. 154(b) by 161 days.

(21) Appl. No.: 16/159,296

(22) Filed: Oct. 12, 2018

(65) Prior Publication Data

US 2019/0184779 A1    Jun. 20, 2019

Related U.S. Application Data

(60) Provisional application No. 62/599,499, filed on Dec. 15, 2017.

(51) Int. Cl.
| | | |
|---|---|---|
| B60C 29/00 | (2006.01) | |
| B60C 29/06 | (2006.01) | |
| B29C 73/16 | (2006.01) | |

(52) U.S. Cl.
CPC .......... B60C 29/005 (2013.01); B60C 29/062 (2013.01); B29C 73/166 (2013.01)

(58) Field of Classification Search
CPC ..... B60C 29/005; B60C 29/062; B60C 29/00; B60C 29/02; B29C 73/166
See application file for complete search history.

(56) References Cited

U.S. PATENT DOCUMENTS

| | | | | |
|---|---|---|---|---|
| 627,865 | A * | 6/1899 | Mingay | B60C 29/02 152/427 |
| 6,454,892 | B1 * | 9/2002 | Gerresheim | B29C 73/163 152/503 |
| 9,290,070 | B2 * | 3/2016 | Lelievre | B60C 29/005 |
| 9,803,118 | B2 * | 10/2017 | Okamatsu | B29C 73/163 |
| 2002/0049260 | A1 * | 4/2002 | Howe | C09K 3/30 521/98 |
| 2005/0087228 | A1 * | 4/2005 | Uleski | B60C 23/0494 137/223 |
| 2005/0087229 | A1 * | 4/2005 | Uleski | B60C 23/0408 137/223 |
| 2014/0261753 | A1 * | 9/2014 | Burlett | B60C 1/00 137/231 |
| 2015/0328944 | A1 * | 11/2015 | Chen | B60C 29/02 152/428 |
| 2015/0343861 | A1 * | 12/2015 | Gosi | B60C 23/0408 137/227 |
| 2017/0341324 | A1 * | 11/2017 | Lee | B05B 15/65 |
| 2018/0086161 | A1 * | 3/2018 | Lin | B60C 23/12 |

* cited by examiner

*Primary Examiner* — Kip T Kotter
(74) *Attorney, Agent, or Firm* — Greensfelder, Hemker & Gale, P.C.; Mark E. Stallion

(57) ABSTRACT

The present invention provides a tire valve stem assembly for a pneumatic tire having a valve stem for inflating the tire and having a member extending from the valve stem into an interior of the tire to prevent clogging or minimize clogging of the valve stem by leak sealing material.

17 Claims, 5 Drawing Sheets

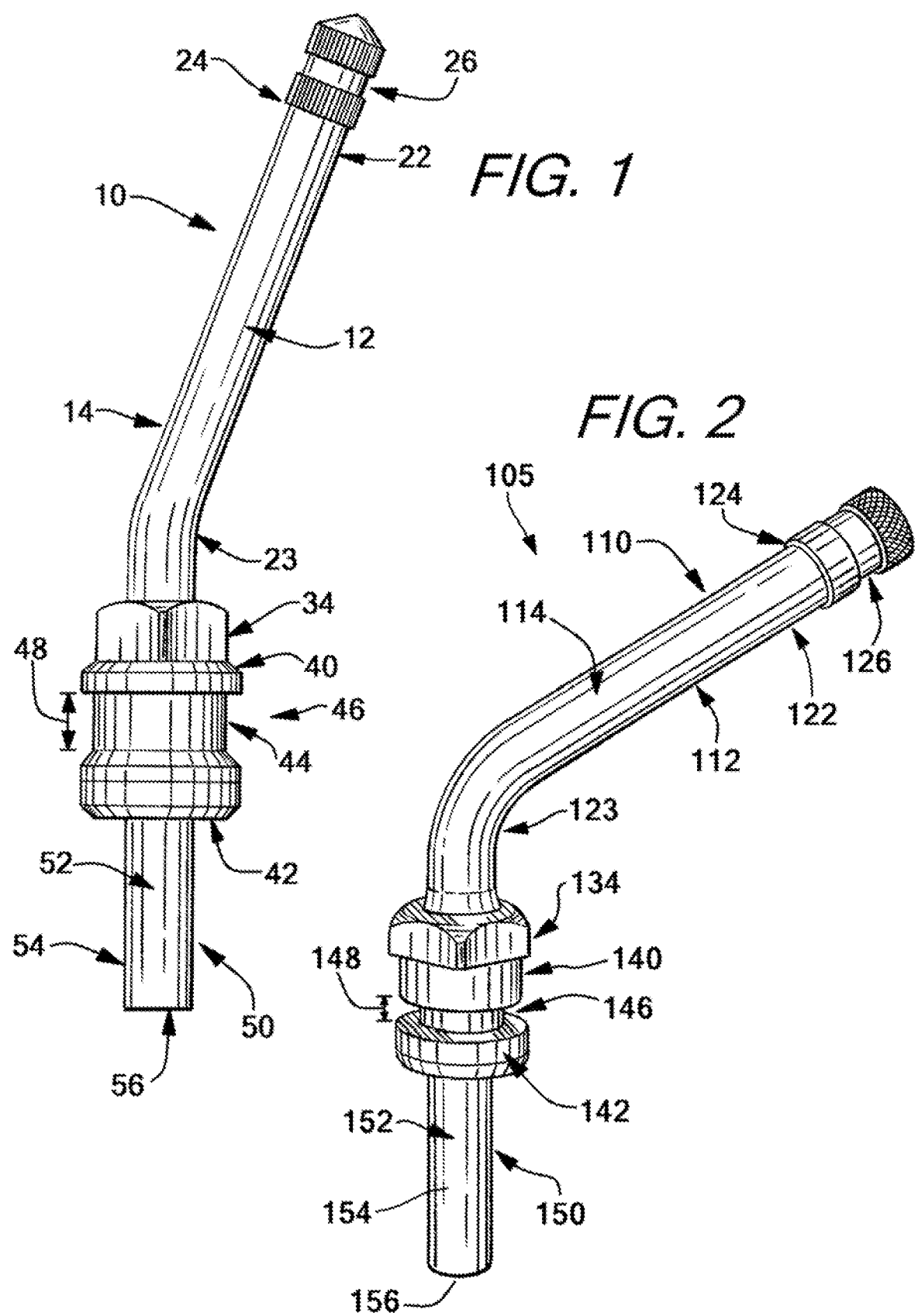

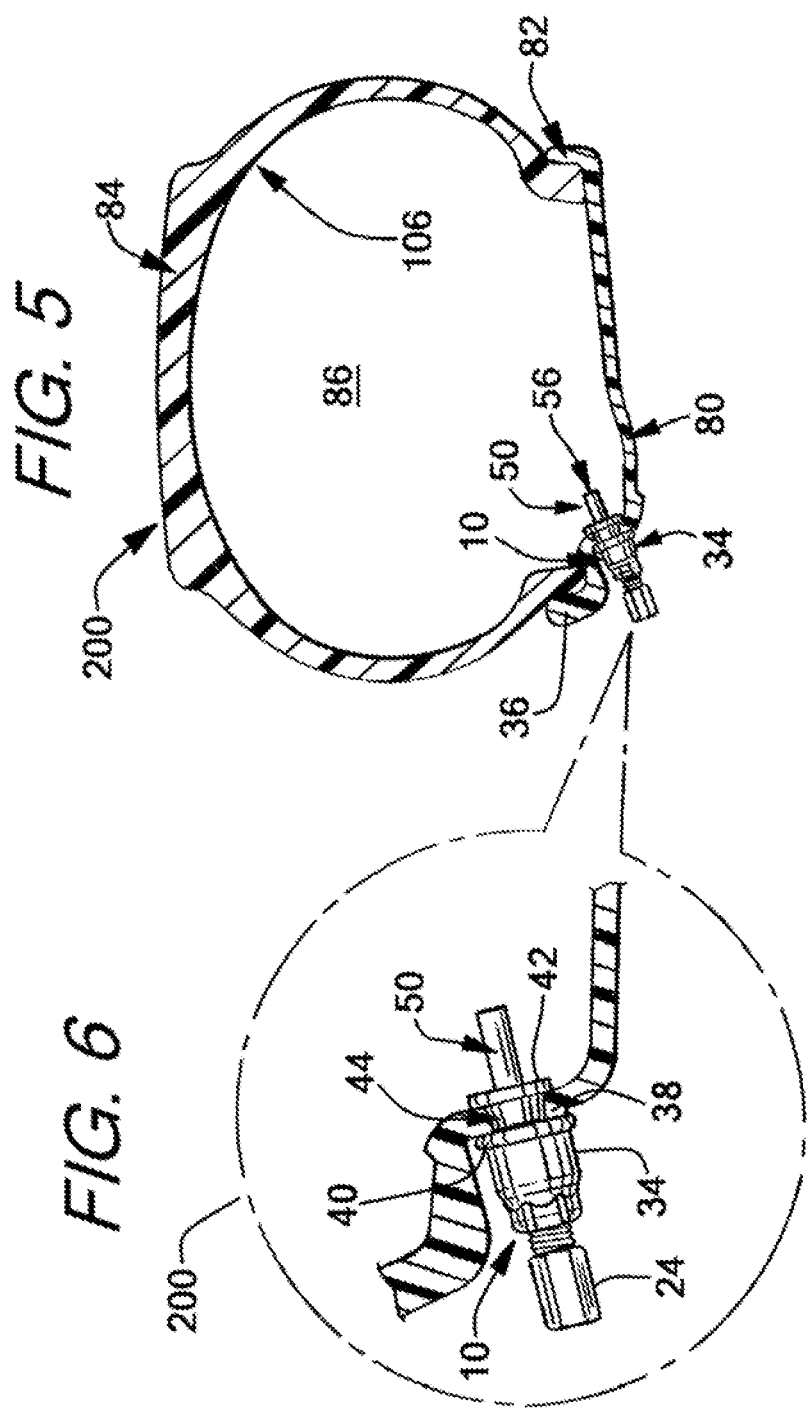

VALVE STEM APPARATUS, ASSEMBLIES AND METHODS FOR USE

CROSS-REFERENCE TO RELATED APPLICATION

This application claims priority to U.S. Provisional Patent Application Ser. No. 62/599,499 filed on Dec. 15, 2017, and is incorporated herein by reference in its entirety and made a part hereof.

FIELD OF THE INVENTION

This technology relates generally to valve stems and, more particularly, to valve stems that resist clogging when a sealing material is introduced to an interior of the tire through the valve stem.

BACKGROUND

Pneumatic tires are normally inflated to a safe operating pressure using inflation equipment such as an air pump. The air pump usually has a high-pressure line to deliver the air under pressure. The high-pressure line typically has a valve interface that connects to a tire valve stem to deliver air under pressure to the interior of the tire. The air pump system may also have an integral pressure gauge for measuring tire pressure. Some vehicles have onboard pressure gauges or other sensor systems that monitor air pressure. These onboard systems may also include air pumps that are operable to add air under pressure to the vehicle tires as needed.

The valve stem usually has an axial air passage which has a valve, which may be a closure ball valve or other axial valve that is seated by a compression spring within the axial airway. A valve cap covers an axial passage with an air distributor that also includes an axial member for depressing the valve ball to allow minimal air flow.

Incorrect pressure in a vehicle's tire can result in improper and uneven wearing of the tire, handling hazards and decreased fuel efficiency. Tires can lose air due to slow leaks from punctures in the tire or leaks around the rim to tire interface, which will result in an incorrect tire pressure. Loss of air resulting in lower than desired tire pressure will ultimately result in the same problems of improper and uneven wearing of the tire, handling hazards and decreased fuel efficiency. To prevent air loss, tire sealants have been used to seal punctures up to ¼ of an inch and/or seal other leaks. The sealants are injected through the valve stem and are applied to the interior of the tire surface, including being applied around the area of the valve stem grommet, due to the centrifugal force inside the tire caused by the rotating rim and tire. Checking air pressure or depressing the valve core to let air out of a tire can clog the valve stem and valve. Clogging of the valve stem may result in the inability to add air to the tire in order to properly inflate a tire or cause air loss due to the inner valve getting stuck open. The inability to add air to a tire in order to have a properly inflated tire will potentially result in the problems outlined above.

Sudden and substantial air loss can also occur upon tire puncture due to striking road hazards such as nails, or other sharp objects and cause a flat tire. Tire repair kits are sold in aerosol cans under well-known tradenames, for example, FIX-A-FLAT®, and SLIME®. These products are available in numerous retail locations for car owners to store in their trunk in the event they experience a flat tire. The kits only provide a temporary fix and must be followed up with a more permanent repair by a tire professional. Typically, the aerosol can contains a sealant material of a natural rubber or a cellulose or other fibrous material that is mixed with a propellant and stored under pressure. The contents of the can are delivered through a hose with a fitment for docking to the tire stem threads upon activation of a valve by a user. The sealant material is spread throughout the interior of the tire upon rotation of the tire. The sealant material has been known to clog the airway of prior art stem valves. If this occurs before the tire is properly inflated, the tire may be rendered uninflatable, subject to air loss, inefficient, useless and unsafe to operate.

A better apparatus and/or method is needed for improving a valve stem design such that the valve stem does not clog due to use of a tire sealant, or other additives or materials, including but not limited to balancers, conditioners and rust inhibitors.

SUMMARY OF THE INVENTION

The technology as disclosed herein includes a method and apparatus for a valve stem that resists clogging when a tire sealant, or other materials or additives are utilized. One implementation of the technology as disclosed and claimed herein is a valve stem, which includes a valve stem body having an axial airway through which airflow is controlled by an axial valve. One end of the valve stem body is an air input port end including a ball valve. The input port end has an external thread over which a cap is screwed. The far most end of the valve stem body is the output port end, which includes an outer grommet and an inner grommet, with a short neck portion there between, where the neck portion's length is approximately equal to the thickness of a rim, on which it is designed to be installed, and an output port opening positioned at the inner grommet. For one implementation of the technology the output port opening includes a tubular extension attached to the output opening thereby effectively extending the output opening by an extended distance from the inner grommet. For one implementation of the technology, the extended distance is approximately 1 inch in length, however the extension distance can be approximately 0.5 inches or greater in length depending on the type of wheel and tire for which the valve stem is designed.

One implementation of the technology includes a tire valve stem including a valve stem body having an axial airway and said valve stem body includes an input port end and an output port end where an output port opening is positioned at the far most end of the valve stem body with respect to the input port end and positioned at an inner grommet immediately adjacent a neck portion. The neck portion has a length approximately equal to a thickness of a tire rim or wheel for which the valve stem body is designed. A tubular extension having an axial airway, and the tubular extension further having one end attached to the output port opening thereby effectively extending the output opening an extended distance from the inner grommet. For one implementation, the extended distance is approximately 0.5 inches or greater in length. For many applications, the extension length is approximately 0.5, 0.6, 0.7, 0.8, 0.9 or 1 inch(es) in length depending rim size, dimension and design. However, for yet another implementation of the tire valve stem as disclose and claimed, the extended distance is approximately 1 inch.

The features, functions, and advantages that have been discussed can be achieved independently in various implementations or may be combined in yet other implementations further details of which can be seen with reference to the following description and drawings.

The present invention provides a tire valve stem assembly for a pneumatic tire having a body, a first fitment, a second fitment, a seal, and a member for preventing clogging. The body has an input end, an output end, and an axial airway through the body and connecting the input end and the output end. The first fitment is at the input end for connecting to a source of air under pressure. The second fitment is at the output end for connecting to a portion of a rim. The seal is on an outer surface of the body and is disposed between the first fitment and the second fitment for forming an airtight seal with a throughole of the rim. The member for preventing clogging extends axially from the output end and has an extended airway in fluid communication with the axial airway through the body and a surface to block particulate material from clogging the axial airway to airflow.

The present invention further provides a rim assembly having a rim, a valve stem assembly. The rim has an annular wall having an inside surface and an outside surface and a through hole extending between and connecting the inside surface to the outside surface. The valve stem assembly is in the through hole has a valve stem with an input proximate the outside surface, an output end at the inside surface, and a seal on an outer surface of the valve stem disposed between the inside surface and the outside surface. The seal is in sealing contact with the through hole. An axial airway extends through the valve stem and connects the input end and the output end. A first fitment at the input end is for connecting to a source of air under pressure. A member extends axially from the output end and has an extended airway in fluid communication with the axial airway through the valve stem and a surface to block particulate material from clogging the axial airway to airflow.

The present invention further provides a tire and rim assembly having a rim, a valve stem, and a tire. The rim has an annular wall having a thickness, a first surface and an opposed second surface. The rim also has an inside portion, and an outside portion, and a through hole connecting the inside portion to the outside portion. The valve stem is in the through hole and has an input end extending beyond the first surface in the outside portion and an output end in the inside portion in sealing contact with the second surface to seal the through hole. An axial airway through the body connects the input end and the output end. A first fitment is at the input end for connecting to a source of air under pressure. A valve is disposed in the axial airway for controlling the flow of air through the axial airway. A member extends from the output end and is in fluid communication with the airway and has a surface spaced from the second surface to block particulate material from clogging the axial airway to airflow. The tire is mounted to the rim and has a portion forming an airtight seal with the rim and capable of holding air under pressure delivered through the valve stem in the inside portion.

The present invention further provides a method of treating a pneumatic tire having a rim having a first surface, a second surface and a through hole. The tire also has a first valve stem mounted to the rim and extends through the through hole, and a tire mounted to the rim. The method includes the steps of: (1) providing a valve stem assembly having a body with an input end extending beyond the first surface, an output end in sealing contact with the second surface to seal the through hole, an axial airway through the body and connecting the input end and the output end, a first fitment at the input end for connecting to a source of air under pressure, a valve disposed in the body for controlling the flow of air through the axial airway, and a member extending axially from the output end and in fluid communication with the airway and having a surface spaced from the second surface to block particulate material from clogging the axial airway to airflow; and (2) delivering an effective amount of a sealing material under pressure through the valve stem to form an leak-resistant tire.

The present invention further provides a method of repairing a pneumatic tire with an air leak. The tire having a rim having a first surface, a second surface and a through hole, a valve stem is mounted to the rim, and a tire is mounted to the rim. The method of treating includes (1) providing a valve stem having a body with an input end extending beyond the first surface, an output end in sealing contact with the second surface to seal the through hole, an axial airway through the body and connecting the input end and the output end, a first fitment at the input end for connecting to a source of air under pressure, a valve disposed in the body for controlling the flow of air through the axial airway, and a member extending axially from the output end and in fluid communication with the airway and having one or more of an extension and a surface spaced from the second surface to block particulate material from clogging the axial airway to airflow; (2) delivering a sealant material under pressure through the valve stem to seal the air leak; and (3) delivering air under pressure to inflate the tire to its recommended pressure. The sealing material can be contained under pressure in an aerosol can. These and other advantageous features of the present technology as disclosed will be in part apparent and in part pointed out herein below.

BRIEF DESCRIPTION OF THE FIGURES

For a better understanding of the present technology as disclosed, reference may be made to the accompanying figures in which:

FIGS. 1 and 2 illustrate valve stems having an extension tube attached to the output port opening at the inner grommet.

FIGS. 5 and 6 are sectional perspective views of the valve stem to tire rim interface with the extension tube of the present invention.

DETAILED DESCRIPTION

Figure 3:
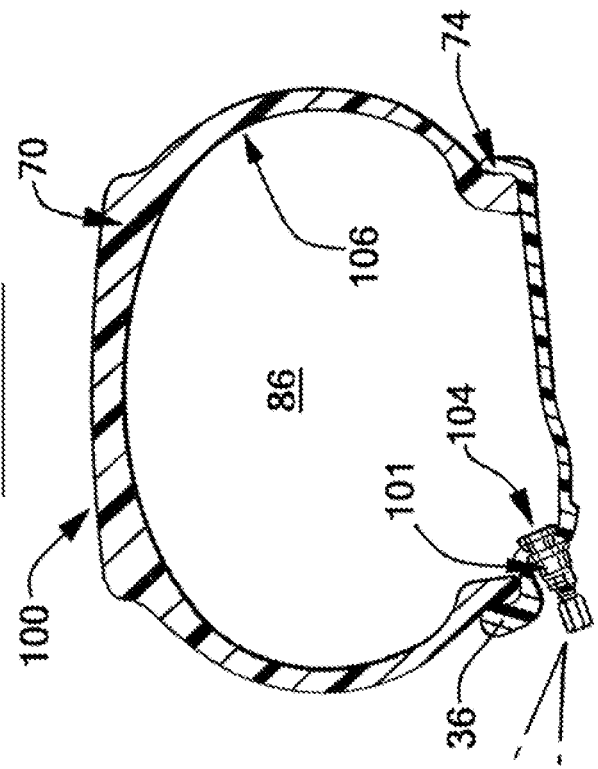
FIGS. 3 and 4 are a sectional perspective views of a prior art valve stem to tire rim interface.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

Figure 7:
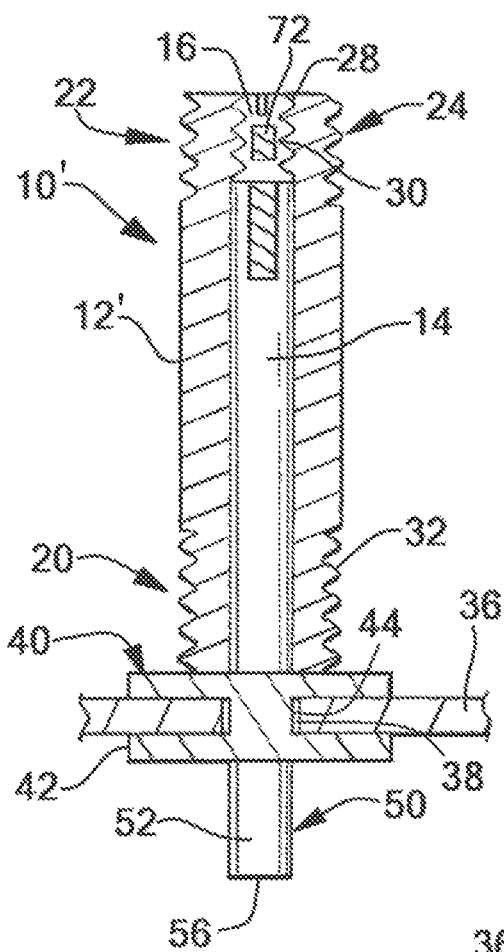
FIG. 7 is a side elevation view in partial cross section of a rim assembly of the present invention.

FIGS. 1, 2 and 7 show one preferred form of a valve stem assembly 10, 105 having a valve stem body 12, 112 defining an interior axial airway 14, 114 through which airflow is controlled by a valve 16, 116 coaxially disposed in the airway 14, 114. The valve stem body 12, 112 has a proximal end 20, 120 and an opposed distal end 22, 122. The valve stem body 12 can be linear (FIG. 7), or have a bend 123 of varying degrees, with a lesser bend 23 shown in FIG. 1, and a greater bend 223 shown in FIG. 2, in comparison. The stem body 12, 112 can be of different shapes than those shown, as is well known to those of skill in the art, and without departing from the scope of the present invention.

A first set of external threads 24 is on the distal end 22 for mating with threads supported in a cap 26. A set of internal threads 28 proximal the distal end is for mating with a pair of external threads 30 on the valve 16. A second set of external threads 32 on the proximal end 20 is for receiving a nut 34, 134 and a washer 35, 135 for fastening the valve stem 10, 110 to a rim 36.

To form an airtight seal with a through hole 38 through the rim 36, a sealing member is placed in the through hole 38, 138, in this case, grommets having flanges 40 and 42 spaced from one another along a stem portion 44 of the stem body 12 to form a gap. The stem portion 44, 144 is dimensioned to form an airtight seal with the through hole 38 and preferably has a length 48, 148 essentially equal to a thickness of the rim at the hole 38. The stem portion 44, 144 of FIG. 1 is larger than that of FIG. 2, and, therefore, is for use with a thicker rim wall. The grommet flanges 40, 140 and 42, 142 have a surface extending circumjacent the through hole 38 and form an airtight seal with the through hole 38.

To prevent or reduce the tendency for particulate material inside a tire from clogging the valve stem assembly 10' having a valve stem body 12', a member 50, 150 extends axially from the stem 44, 144 and is in fluid communication with the airway 14, 114. The member 50, 150 has a surface 52, 152, or surfaces, to block particulate material or other material from clogging the axial airway to airflow. In one preferred form, the member 50 is a cylindrical tube having an outer surface 52, 152 and defining a lumen 54, 154 therethrough and an opening 56, 156 to allow airflow in and out of a tire. The member 50, 150 can have a length of from about ¼ inch to about 3 inches, more preferably from about ½ inch to about 2 inches, and even more preferably from ½ inch to 1 inch, or any range or combination of ranges therein.

Figure 8:
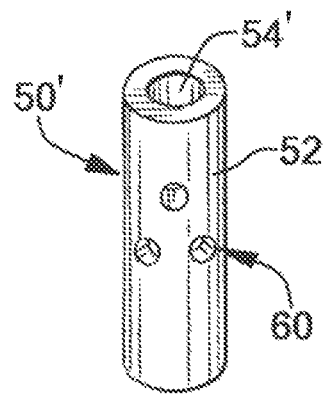
FIG. 8 is a perspective view of a member for extending an air passage.

FIG. 8 illustrates on implementation of the technology where a member 50' that has supplemental air passages 60 extending radially through the member and in fluid communication with the lumen 54'. The supplemental air passages 60 may increase air flow and increase the probability that the lumen 54' and axial airway will remain open under conditions where prior art valve stems would clog.

Figure 9:
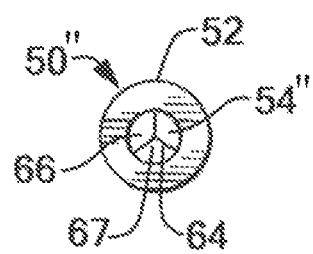
FIG. 9 is an end view of a member for extending an air passage.
Figure 10:
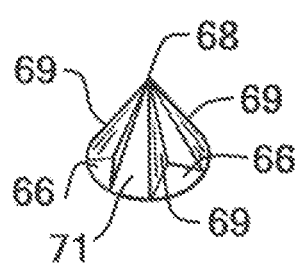
FIG. 10 is a perspective view of an arrowhead-shaped block breaker.

FIG. 9 shows a member 50" with an optional clog breaking member 64 coaxially disposed in lumen 54" for providing a surface to break up particulate material or to direct it through one of the throats 66 of the clog breaker 64. The clog breaker 64 can take on a variety of shapes including a three-armed 67, Y-shaped member. The clog breaker 64 can be flat in axial dimension or can take on the shape of an arrowhead as shown in FIG. 10. In one form of the invention, the arrowhead has a tip 68 centrally disposed in the lumen with three wall surfaces 69 circumferentially spaced from one another by 120°. The walls extend axially downwardly and radially outwardly where they abut or attach to an inner surface of the lumen. Three air passages 71 are formed between the three walls and are in fluid communication with the lumen 71. One or more of these clog breakers 64 can be disposed in the lumen and spaced from one another, provided that they serve the purpose of preventing clogs and not creating clogs.

Figure 4:
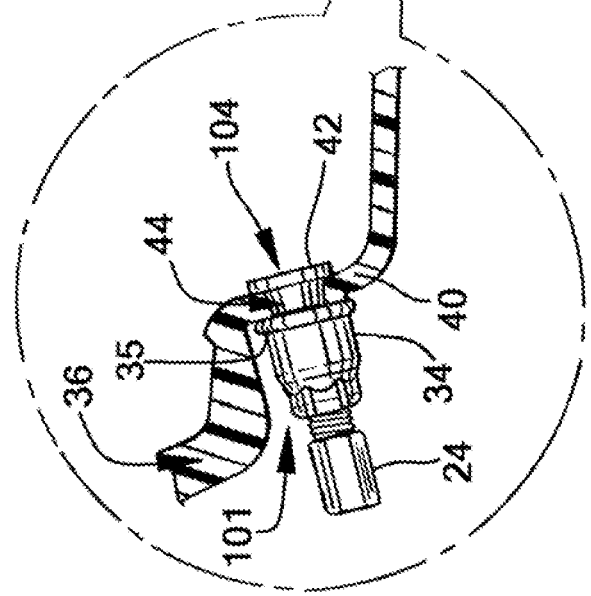

FIGS. 3 and 4 show a prior art tire assembly 100 having a prior art valve stem 101, the rim 36, and a tire 70. FIGS. 5 and 6 show a tire assembly 200 of the present invention having the valve stem assembly 10, 105 in lieu of the prior art valve stem 101. In the prior art tire and rim assembly 100, the proximal end of the valve stem body has an opening 104 that is generally flush with an inner surface 106 of the tire 70 and/or the rim. When the sealing material is being injected into a tire it can initially build up around the opening 104 or can flow from adjacent surfaces into the opening to form a clog. By moving the opening 104 away from the inner tire surface 106 or the inner rim surface, it is less likely to be clogged. Clogging is substantially eliminated because tire sealant being applied to the inner surfaces is less likely to build up around, or cover the opening of the tubular extension and thus less likely to clog.

Suitable valve stem assemblies 10, 105 can be fabricated from material such as rubber, natural latex, synthetic rubber, plastic, and metal. Suitable metals include aluminum, stainless steel, steel, and chrome. Valve stems are available in numerous sizes and configurations to fit any pneumatic tire for use with bicycles, motorcycles, tricycles, cars, trucks, vans, and other wheeled vehicles. Any of these prior art valve stems can be modified to include the anti-clogging member 50, including its various implementation illustrated herein, into its design in accordance with this invention. The valve 16 can be activated by pressing an actuator pin 72 inwardly which opens an air passage. The valve is spring loaded and the actuator pin 72 is pressed closed when activating contact is removed. Other types of valves including ball valves, for example, are also suitable.

Figure 11:
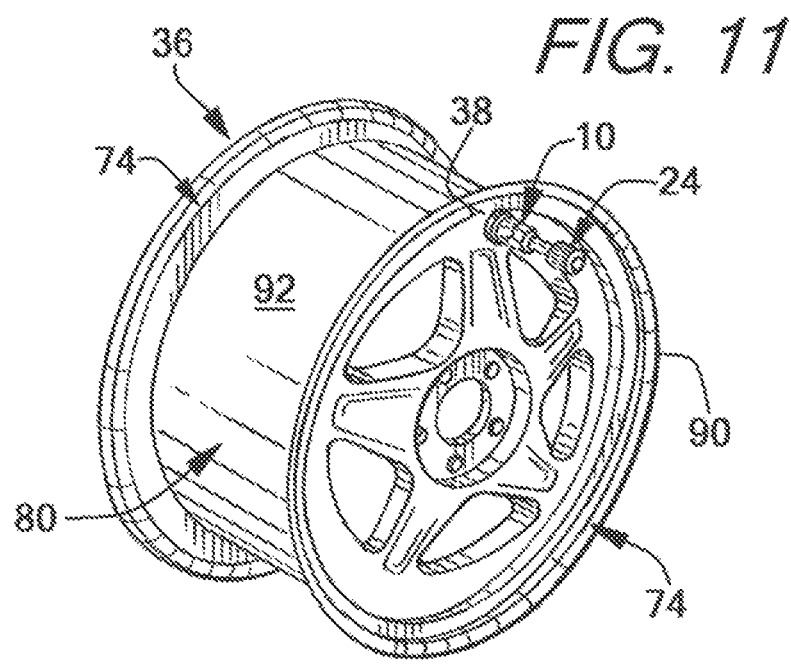
FIG. 11 is a perspective view of a rim.

Suitable rims 36 of the present invention are widely available for purchase and come in numerous sizes, configurations and materials for use in any wheeled vehicle. Rims can be fabricated from metals, plastics, composites, ceramics, carbon fiber or other suitable material. As shown in FIG. 11, a typical rim has an annular wall 80 flanked by opposed, upstanding, radially directed flanges 82 extending from opposed peripheral edges of the annular wall. As is well known in the art, a tire 84, with an air chamber 86, is mounted to the rim 36 so that two spaced beads on the tire form an air tight seal with one of each of the flanges 74 to maintain air under pressure in the tire air chamber 86. Rims also have a through hole 38 for receiving a valve stem assembly 10, 105 in air-tight sealing engagement and for connecting an outside portion of the rim 90 (ambient) to an inside portion 92 (in air chamber 86).

Figure 12:
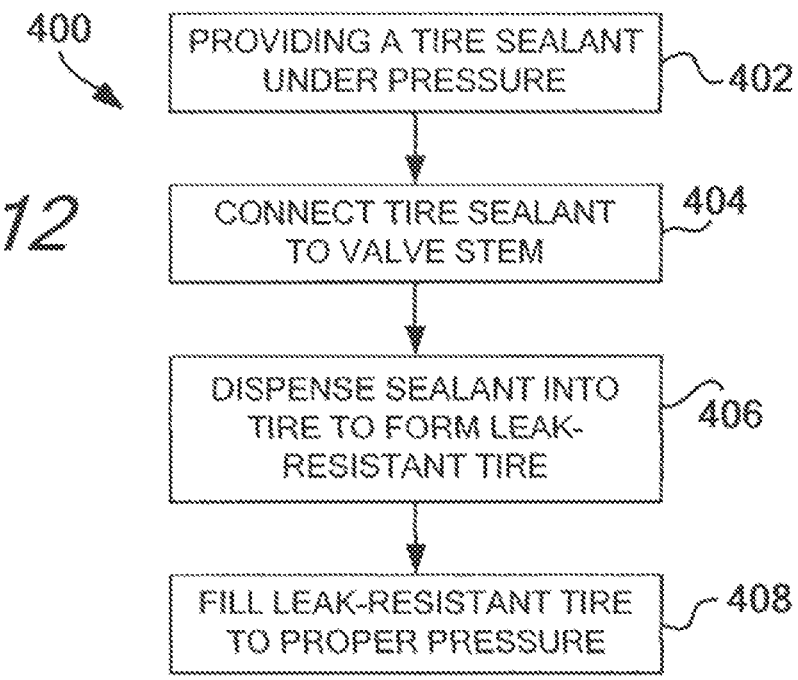
FIG. 12 is a flowchart of a method of treating a tire to prevent air leaks of the present invention.

FIG. 12 shows the steps in a method 400 for treating a tire and rim assembly 200 to resists air leaks. Step 402 requires providing a tire sealing product stored under pressure, and in step 404 connect the tire sealing product to the valve stem of the present invention. In step 406, dispense an effective amount of the sealing material into the tire to form a leak-resistant tire. In step 408, dispense air into the leak-resistant tire to reach the prescribed safe operating pressure of the tire. The method 400 can also include the step of rotating the leak-resistant tire about its axle to spread the sealing material inside the tire.

Figure 13:
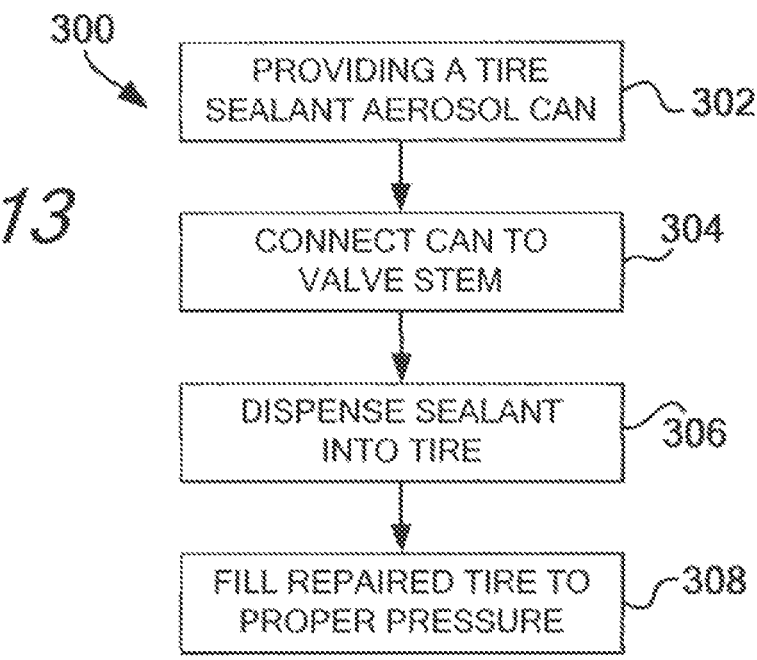
FIG. 13 is a flowchart of a method of repairing a tire having an air leak.

FIG. 13 shows the steps in a method 300 for repairing a tire and rim assembly 200 having a punctured tire that compromises the fluid tight seal of the tire air chamber 86. Step 302 requires providing a tire sealing product stored in an aerosol can as described herein, and in step 304 connect the nozzle of the can to the valve stem of the present invention. In step 306, dispense a prescribed portion of the contents of the can into the damaged tire to form a repaired tire. In step 308, dispense air into the repaired tire to reach the prescribed safe operating pressure of the tire. The method 300 can also include the optional steps of removing a valve stem from a damaged tire and replacing it with a valve stem of the present invention. The method can optionally include the step of rotating the repaired tire about its axle to spread the sealing material inside the tire.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

I claim:

1. A tire valve stem assembly for a pneumatic tire comprising:
   a first tubular body having an input end, an output end, and an axial airway through the body and connecting the input end and the output end;
   a first fitment at the input end for connecting to a source of air under pressure;
   a second fitment at the output end for connecting to a portion of a rim, the second fitment including a set of threads on an outer surface of the first tubular body;
   a grommet on an outer surface of the first tubular body having a stem portion connecting an outer grommet flange and an inner grommet flange, the stem portion passes through a through hole of the rim and the outer grommet flange is in contact with an outer surface of the rim and the inner grommet flange is in contact with an inner surface of the rim;
   a threaded fastener threadably engaged with the set of threads and pressing the outer grommet flange into engagement with the outer surface of the rim;
   a second tubular body separately formed from the first tubular body and the grommet, the second tubular body having openings at opposed ends, the second tubular body extending axially from the output end and having an extended airway in fluid communication with the axial airway through the first tubular body, and a supplemental air hole positioned intermediate of the opposed ends and extending radially through the second tubular body in fluid communication with the extended airway.

2. The tire valve stem assembly of claim 1 wherein the second tubular body extends a distance from the output end approximately 0.5 inches or greater.

3. The tire valve stem assembly of claim 2 further comprising a valve disposed in the first tubular body for controlling the flow of air through the axial airway.

4. A rim assembly comprising:
   a rim having an annular wall having an inside surface and an outside surface and a through hole extending between and connecting the inside surface to the outside surface; and
   a valve stem assembly positioned in the through hole comprising:
   a first tubular body having an input end, an output end, and an axial airway through the first tubular body and connecting the input end and the output end;
   a first fitment at the input end for connecting to a source of air under pressure;
   a second fitment at the output end for connecting to a portion of the rim, the second fitment including a set of threads on an outer surface of the first tubular body;
   a grommet on an outer surface of the first tubular body having a stem portion connecting an outer grommet flange and an inner grommet flange, the stem portion passes through a through hole of the rim and the outer grommet flange is in contact with the outside surface of the rim and the inner grommet flange is in contact with the inside surface of the rim;
   a threaded fastener is threadably engaged with the set of threads and presses the outer grommet flange into engagement with the outer surface of the rim; and,
   a second tubular body separately formed from the first tubular body and the grommet, the second tubular body having openings at opposed ends, the second tubular body extending axially from the output end and having an extended airway in fluid communication with the axial airway through the first tubular body, and a supplemental air hole positioned intermediate of the opposed ends and extending radially through the second tubular body in fluid communication with the extended airway.

5. The rim assembly of claim 4 wherein the second tubular body has a lumen in fluid communication with the airway and extends a distance from the output end approximately 0.5 inches or greater.

6. The rim assembly of claim 4 further comprising a valve disposed in the body for controlling the flow of air through the axial airway.

7. A tire and rim assembly comprising:
   a rim having an annular wall having an inside surface and an outside surface and a through hole extending between and connecting the inside surface to the outside surface;
   a valve stem assembly comprising a first tubular body having an input end, an output end, and an axial airway through the body and connecting the input end and the output end; a first fitment at the input end for connecting to a source of air under pressure; a second fitment at the output end for connecting to a portion of the rim, the second fitment including a set of threads on an outer surface of the first tubular body; a grommet on an outer surface of the first tubular body having a stem portion connecting an outer grommet flange and an inner grommet flange, the stem portion passes through the through hole of the rim and the outer grommet flange is in contact with the outside surface of the rim and the inner grommet flange is in contact with the inside surface of the rim; a threaded fastener is threadably engaged with the set of threads and presses the outer grommet flange into engagement with the outer surface of the rim; a second tubular body separately formed from the first tubular body and the grommet, the second tubular body having openings at opposed ends, the second tubular body extending axially from the output end and having an extended airway in fluid communication with the axial airway of the first tubular body, and a supplemental air hole positioned intermediate of the opposed ends and extending radially through the second tubular body in fluid communication with the extended airway; and, a tire mounted to the rim having a portion forming an airtight seal with the rim and capable of holding air under pressure delivered through the valve stem in the inside portion.

8. The tire and rim assembly of claim 7 wherein the second tubular body has a lumen in fluid communication with the axial airway.

9. The tire and rim assembly of claim 7 further comprising a cap having a set of threads engaged with the first fitment.

10. The tire and rim assembly of claim 7 wherein the second tubular body has a length of about approximately 0.5 inches or greater.

11. A method of treating a pneumatic tire having a rim having an outer surface, an inner surface and a through hole connecting the outer surface to the inner surface, a first valve stem mounted to the rim and extending through the through hole, and a tire mounted to the rim, the method of treating comprising:

providing a valve stem assembly comprising a first tubular body having an input end, an output end, and an axial airway through the body and connecting the input end and the output end; a first fitment at the input end for connecting to a source of air under pressure; a second fitment at the output end for connecting to a portion of the rim, the second fitment including a set of threads on an outer surface of the first tubular body; a grommet on an outer surface of the first tubular body having a stem portion connecting an outer grommet flange and an inner grommet flange, the stem portion passes through the through hole of the rim and the outer grommet flange is in contact with the outer surface of the rim and the inner grommet flange is in contact with the inner surface of the rim; a second tubular body separately formed from the first tubular body and the grommet and having openings at opposed ends, the second tubular body extending axially from the output end and having an extended airway in fluid communication with the axial airway of the first tubular body, and a supplemental air hole positioned intermediate of the opposed ends and extending radially through the second tubular body in fluid communication with the extended airway; and, delivering an effective amount of a sealing material under pressure through the valve stem to form a leak-resistant tire.

12. The method of claim 11 further comprising the step of delivering air under pressure to inflate the tire to its recommended pressure.

13. The method of claim 11 wherein the sealing material is natural rubber latex.

14. The method of claim 11 wherein the sealing material is a cellulose material.

15. The method of claim 11 wherein the sealing material is a polymeric material.

16. The method of claim 11 wherein the sealing material is a synthetic rubber.

17. The method of claim 11 wherein the sealing material is selected from the group consisting of cellulose, natural rubber latex, synthetic rubber, silicone, and 2-butoxy ethanol.

* * * * *